(12) United States Patent
Goslar

(10) Patent No.: US 11,634,084 B2
(45) Date of Patent: Apr. 25, 2023

(54) MOUNT ADAPTER ASSEMBLY AND METHOD OF USE

(71) Applicant: Tyler Edward Goslar, Rock Valley, IA (US)

(72) Inventor: Tyler Edward Goslar, Rock Valley, IA (US)

( * ) Notice: Subject to any disclaimer, the term of this patent is extended or adjusted under 35 U.S.C. 154(b) by 0 days.

(21) Appl. No.: 17/198,328

(22) Filed: Mar. 11, 2021

(65) Prior Publication Data

US 2022/0289117 A1    Sep. 15, 2022

(51) Int. Cl.
*B60R 9/06*      (2006.01)

(52) U.S. Cl.
CPC ........................ *B60R 9/06* (2013.01)

(58) Field of Classification Search
CPC .......................................... B60R 9/06
USPC .......................................... 224/401
See application file for complete search history.

(56) References Cited

U.S. PATENT DOCUMENTS

| | | | |
|---|---|---|---|
| 4,191,366 A * | 3/1980 | Rabin | B23Q 3/103 269/900 |
| 4,341,452 A | 7/1982 | Korling | |
| 4,558,500 A * | 12/1985 | Kloster | B25B 27/304 29/227 |
| 4,591,250 A | 5/1986 | Woodruff | |
| 5,322,251 A | 6/1994 | Schumer | |
| 5,481,441 A * | 1/1996 | Stevens | B60Q 1/24 362/418 |
| 5,746,535 A * | 5/1998 | Kohler | F16B 37/046 403/258 |
| 6,539,886 B2 * | 4/2003 | Henry | B63B 34/67 114/364 |
| 6,585,465 B1 * | 7/2003 | Hammond | B60P 7/0815 410/104 |
| 8,578,647 B2 | 11/2013 | Storch | |
| 9,050,936 B2 * | 6/2015 | Jordan | B63B 17/00 |
| 9,605,774 B2 | 3/2017 | Shiga | |
| 9,944,217 B2 | 4/2018 | Schroeder | |
| 10,576,868 B1 * | 3/2020 | Gilmour | B60P 7/0815 |
| 11,365,904 B2 * | 6/2022 | Robinson | F24S 25/70 |
| 2012/0126075 A1 | 5/2012 | Chinn | |
| 2014/0197218 A1 * | 7/2014 | Jordan | F16M 11/16 224/545 |
| 2017/0247159 A1 * | 8/2017 | Hansen | B32B 3/18 |

* cited by examiner

*Primary Examiner* — Peter N Helvey

(57) ABSTRACT

A mount adapter assembly for facilitating attachment of articles to a mounting rack includes a first element and a second element. The first element is shaped substantially complementary to at least a first portion of an orifice positioned in a mounting rack. The first element is at least partially insertable into the first portion of the orifice from a first face of the mounting rack. The second element can abut the mounting rack from a second face of the mounting rack. A connector engages the first element to the second element so that the first element and the second element are coupled to the mounting rack. A fastener engaged to the first element can engage a substrate so that the substrate is coupled to the mounting rack. The substrate can be used to attach a variety of articles to the mounting rack.

9 Claims, 12 Drawing Sheets

MOUNT ADAPTER ASSEMBLY AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to adapter assemblies and more particularly pertains to a new adapter assembly for facilitating attachment of articles to a mounting rack, particularly those used with all-terrain vehicles. The present invention discloses an adapter assembly for mounting racks which is readily attachable to a mounting rack by insertion into an orifice positioned in the mounting rack, and which has a threaded hole allowing for attachment of any number of articles to the mounting rack using threaded fasteners.

(2) Description of Related Art Including Information Disclosed Under 37 CFR 1.97 and 1.98

The prior art relates to adapter assemblies used with racks positioned on all-terrain vehicles (ATVs). While ATV racks are constructed to receive a wide variety of attachments, the securing members for the attachments are typically proprietary. Moreover, they frequently employ expansion plugs that can become loose when driving over rough terrain. Because the securing members are proprietary, they limit the types of devices that can be secured to the racks vastly reducing the usefulness of mount locations on the racks.

BRIEF SUMMARY OF THE INVENTION

An embodiment of the disclosure meets the needs presented above by generally comprising a first element and a second element. The first element is shaped substantially complementary to at least a first portion of an orifice positioned in a mounting rack of a vehicle, such as on an all-terrain vehicle. The first element thus is configured to be at least partially insertable into the first portion of the orifice from a first face of the mounting rack. The second element is configured to abut the mounting rack from a second face of the mounting rack. A connector is configured to engage the first element to the second element so that the first element and the second element are coupled to the mounting rack. A fastener engaged to the first element is configured to engage a substrate so that the substrate is coupled to the mounting rack. The substrate can be used to attach a variety of articles to the mounting rack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
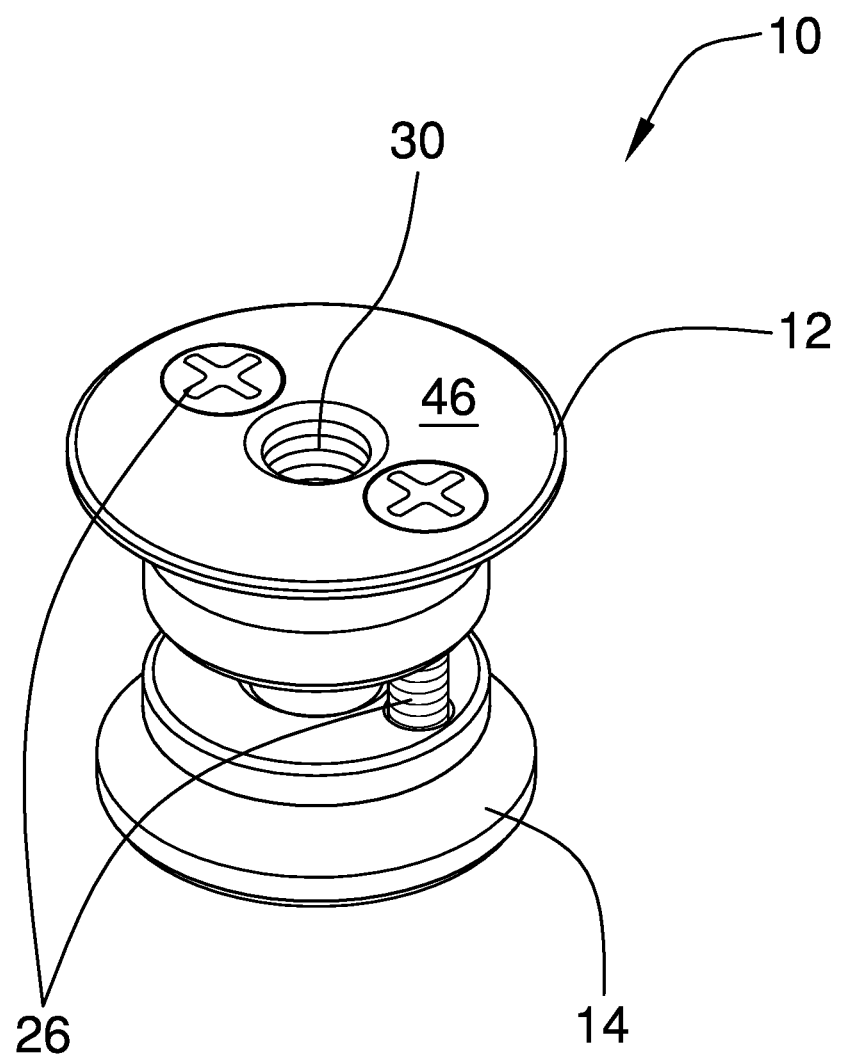
FIG. 1 is a top isometric perspective view of a mount adapter assembly according to an embodiment of the disclosure.

With reference now to the drawings, and in particular to FIGS. 1 through 12 thereof, a new adapter assembly embodying the principles and concepts of an embodiment of the disclosure and generally designated by the reference numeral 10 will be described.

As best illustrated in FIGS. 1 through 12, the mount adapter assembly 10 generally comprises a first element 12 and a second element 14. The first element 12 is shaped substantially complementary to at least a first portion 16 of an orifice 18 positioned in a mounting rack 20 of a vehicle.

The first element 12 is configured to be at least partially insertable into the first portion 16 of the orifice 18 from a first face 48 of the mounting rack 20, such as a mounting rack 20 on an all-terrain vehicle 22. The second element 14 is configured to abut the mounting rack 20 from a second face 24 of the mounting rack 20. A connector 26 is configured to engage the first element 12 to the second element 14 so that the first element 12 and the second element 14 are coupled to the mounting rack 20.

A fastener 28 is engaged to the first element 12 and is configured to engage a substrate 30 so that the substrate 30 is coupled to the mounting rack 20. The substrate 30 can be used to attach a variety of articles to the mounting rack 20. The substrate 30 can be used by other attachments so that a user of the all-terrain vehicle 22 is not restricted to those attachments made by that particular dealer. In one example, the fastener 28 may comprise a threaded hole 32, which extends axially through the first element 12. Correspondingly, the substrate 30 may comprise a bolt 34, an eyebolt 36, or other threaded fasteners. The substrate 30 is not restricted in being a naked body to which other articles may be attached and may also comprise the base of another element to be secured to the mounting rack 20. A non-threaded hole 78 may be axially positioned through the second element 14 and is positioned for insertion of the bolt 34 or the eyebolt 36.

The connector 26 comprises a pair of first holes 38, a pair of second holes 40, and a pair of screws 42. The pair of first holes 38 is positioned in the first element 12 with the first holes 38 bracketing the threaded hole 32. The pair of second holes 40 is positioned in the second element 14 so that each second hole 40 is selectively alignable with a respective first hole 38. The first holes 38 and the second holes 40 are threaded. Each screw 42 is selectively threadedly insertable into a respective first hole 38 and an associated second hole 40 to removably engage the first element 12 to the second element 14. The first element 12 and the second element 14 thus are removably engaged to the mounting rack 20. The present invention also anticipates the non-threaded hole 78 as possibly being threaded such that the insertion of the bolt 34, the eyebolt 36 or other threaded substrate 30 would connect the first element 12 to the second element 14 and engage them to the mounting rack 20.

Figure 2:
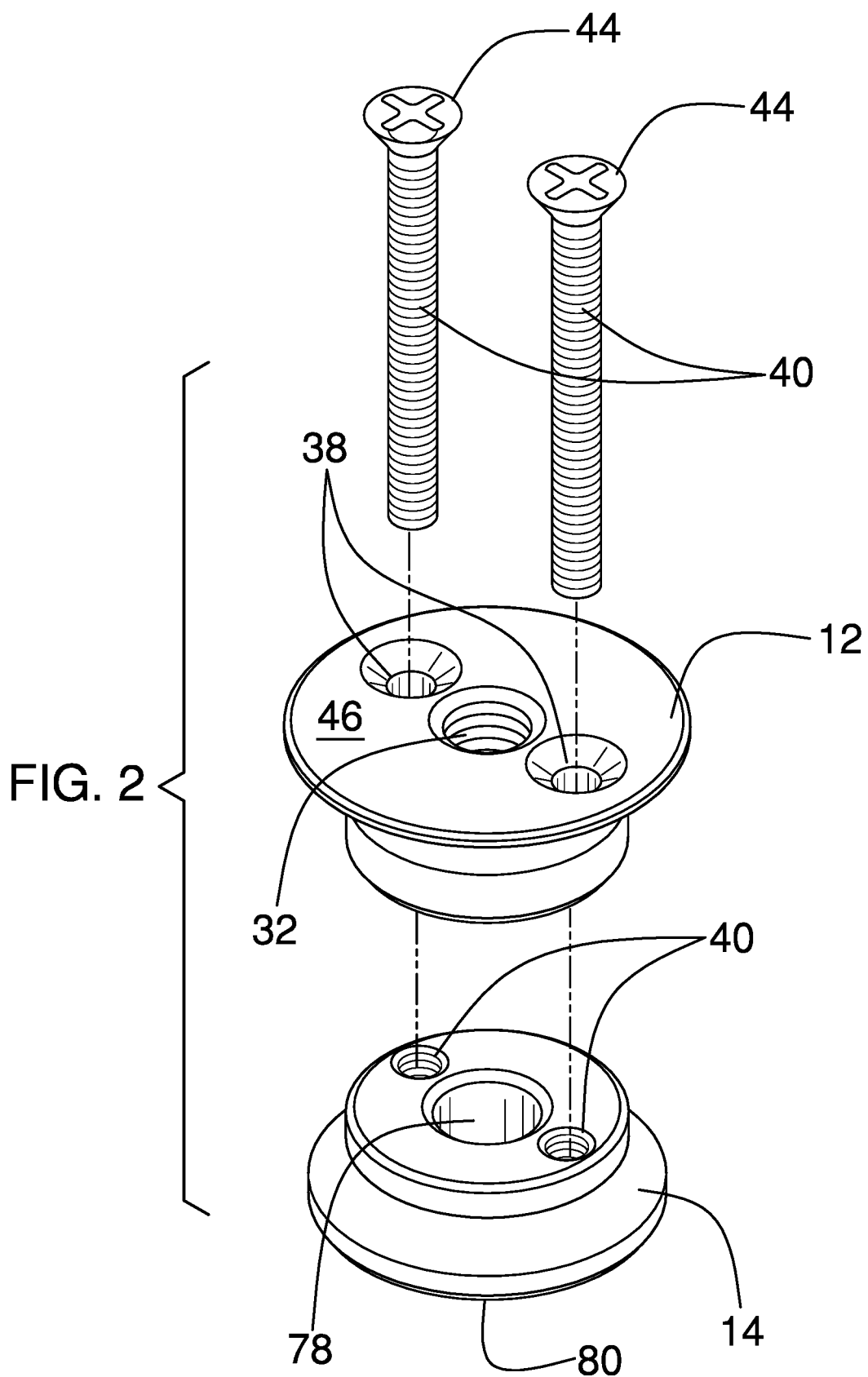
FIG. 2 is an exploded view of an embodiment of the disclosure.

A head 44 of the screw 42 may be tapered, as is shown in FIG. 2. The respective first hole 38 is conical proximate to an outer face 46 of the first element 12 so that the head 44 of the screw 42 is flush with the outer face 46 after it is threadedly inserted into the first hole 38, as shown in FIG. 3.

Furthermore, the first element 12 may be tapered proximate to the outer face 46 so that the outer face 46 is circumferentially larger than an inner face 62 of the first element 12. Thus, with a first element 12 having an outer face 46 that is circular, the first element 12 would be frusto-conically shaped proximate to the outer face 46 and cylindrically shaped adjacent to the inner face 62, as shown in FIG. 3. With the orifice 18 being complementary tapered adjacent to the first face 48, the outer face 46 of the first element 12 is configured to be flush with the first face 48 of the mounting rack 20 when inserted into the orifice 18, as shown in FIG. 3.

Figure 3:
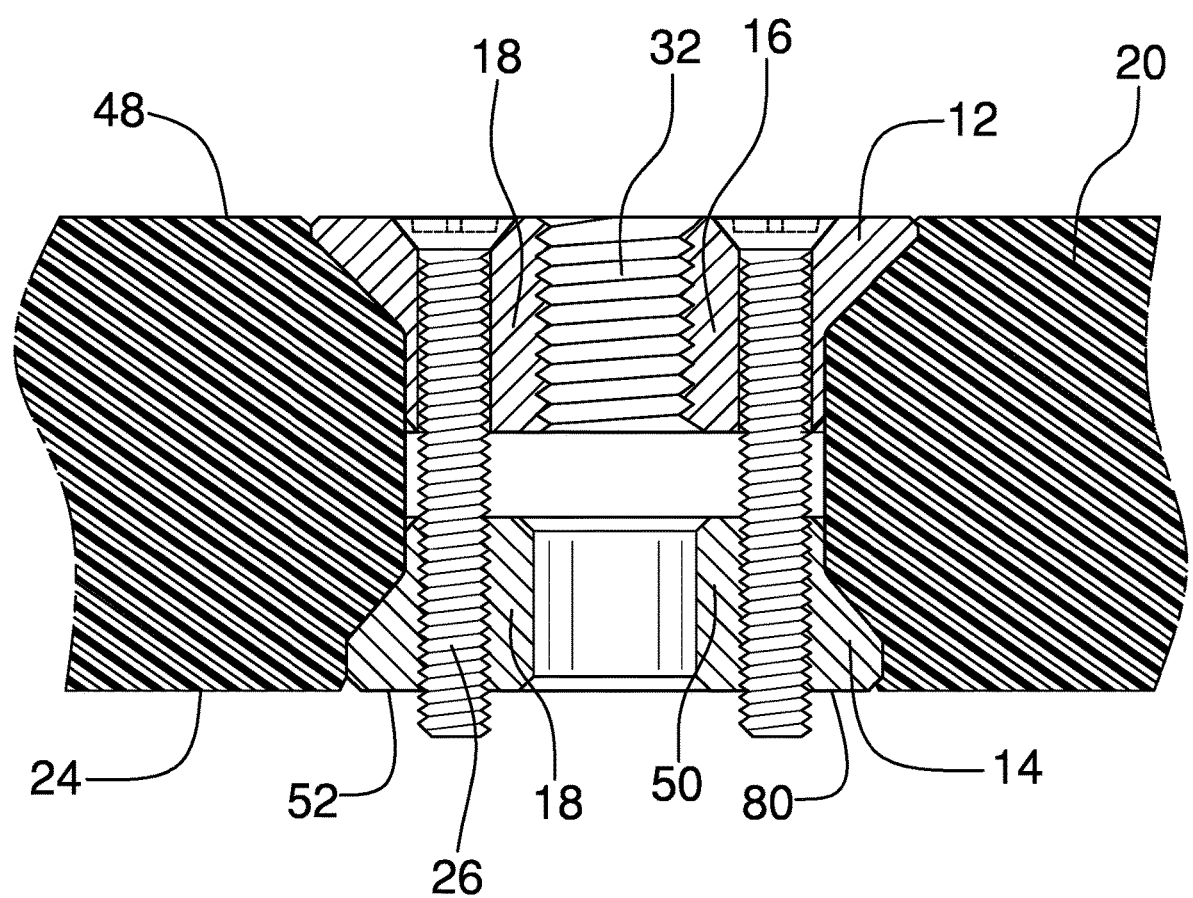
FIG. 3 is a cross-sectional view of an embodiment of the disclosure.
Figure 4:
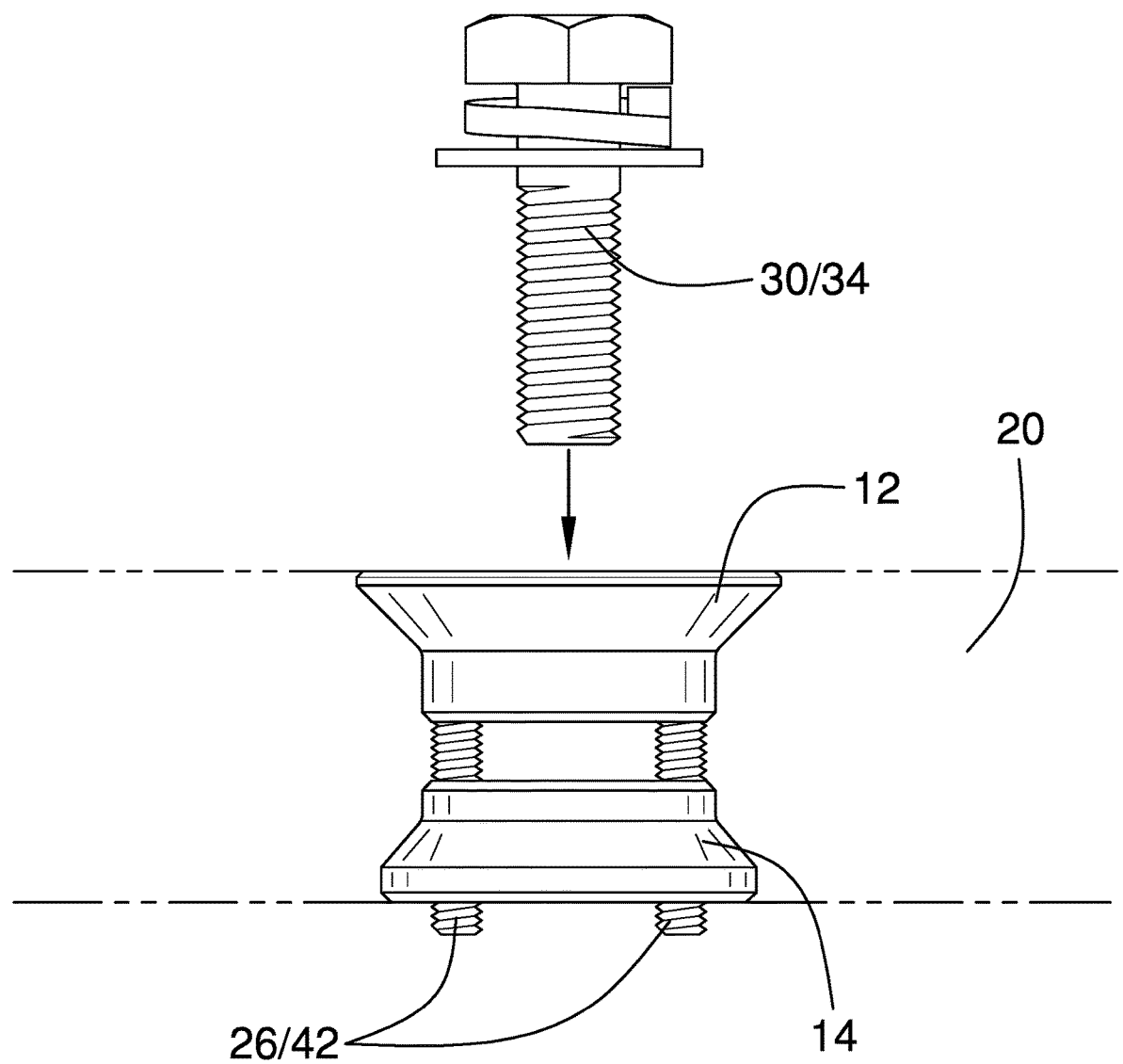
FIG. 4 is a side view of an embodiment of the disclosure.
Figure 5:
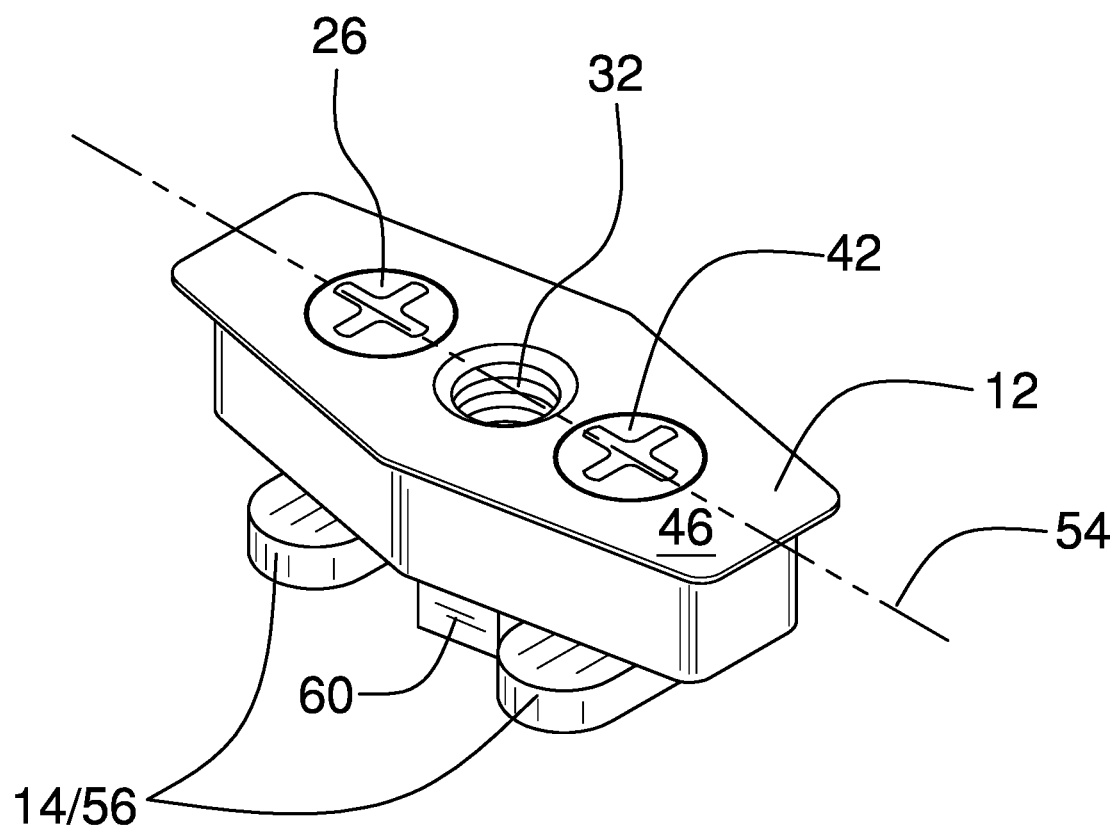
FIG. 5 is a top isometric perspective view of an embodiment of the disclosure.

The second element 14 may be shaped substantially complementary to a second portion 50 of the orifice 18, as shown in FIG. 3. The second element 14 thus is configured to be inserted into a second portion 50 of the orifice 18 from the second face 24 of the mounting rack 20. The second element 14 may be tapered proximate to an exterior face 52 thereof so that the exterior face 52 is circumferentially larger than an interior face 80 of the second element 14. Thus, with a second element 14 having an exterior face 52 that is circular, the second element 14 would be frusto-conically shaped proximate to the exterior face 52 and cylindrically shaped adjacent to the interior face 80, as shown in FIG. 3. With the orifice 18 being complementary tapered adjacent to the second face 24, the exterior face 52 of the second element 14 is configured to be flush with the second face 24 of the mounting rack 20 when the second element 14 is inserted into the orifice 18. Proprietary securing members use for attaching articles to mounting racks 20 may loosen and dislodge from the orifice 18 in rugged conditions. With the first element 12 and the second element 14 being tapered to match the orifice 18, the mount adapter assembly 10 provides for more secure attachment of articles to mounting racks 20.

Figure 6:
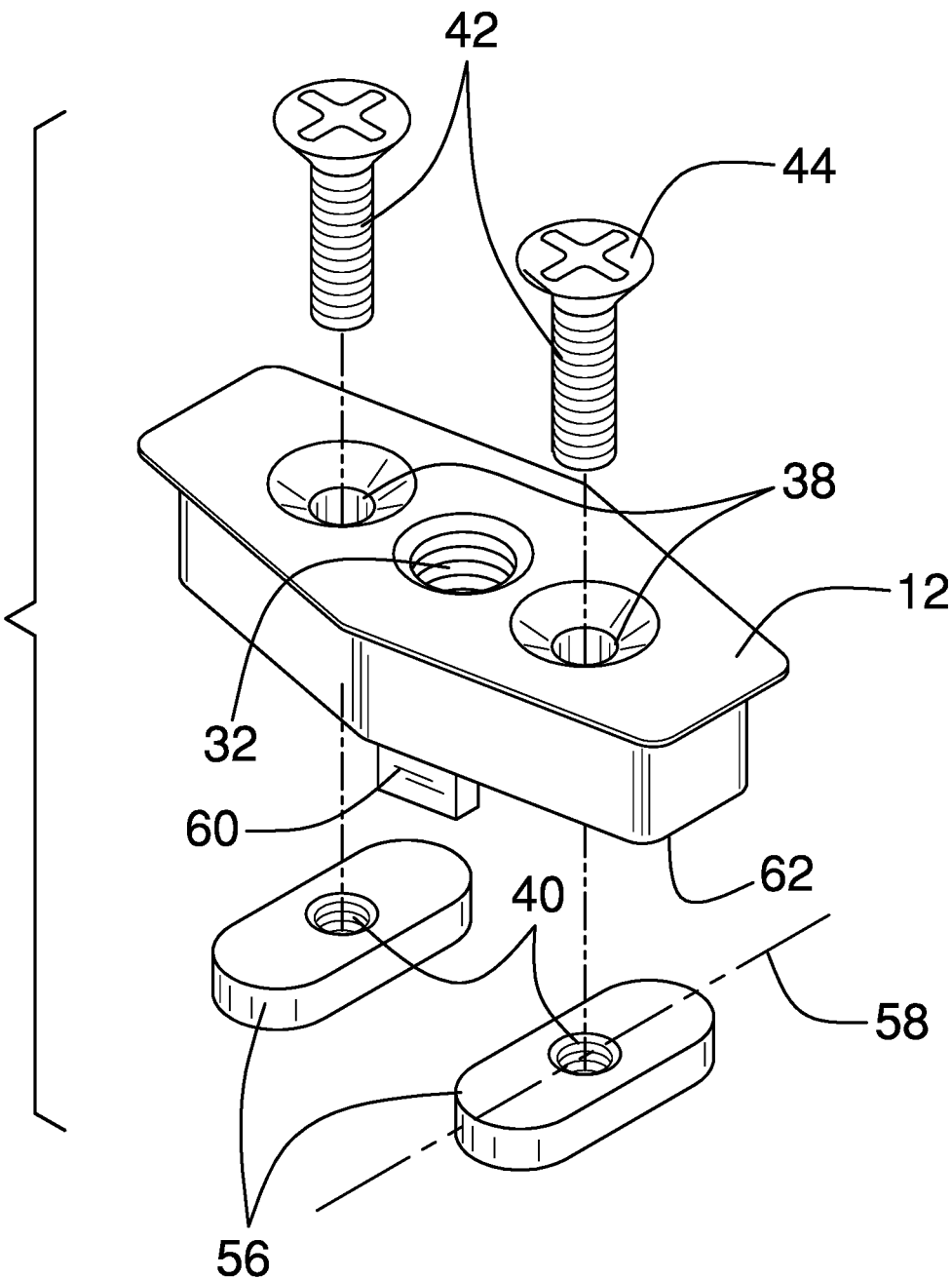
FIG. 6 is an exploded view of an embodiment of the disclosure.
Figure 7:
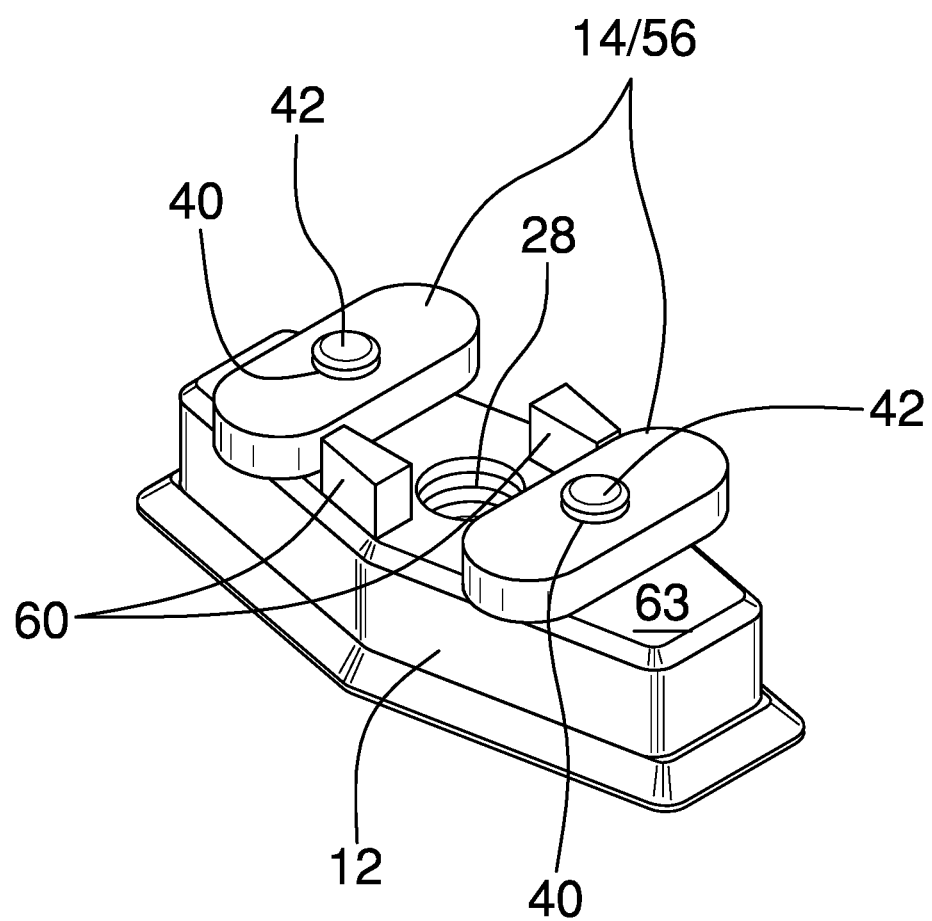
FIG. 7 is a bottom isometric perspective view of an embodiment of the disclosure.
Figure 8:
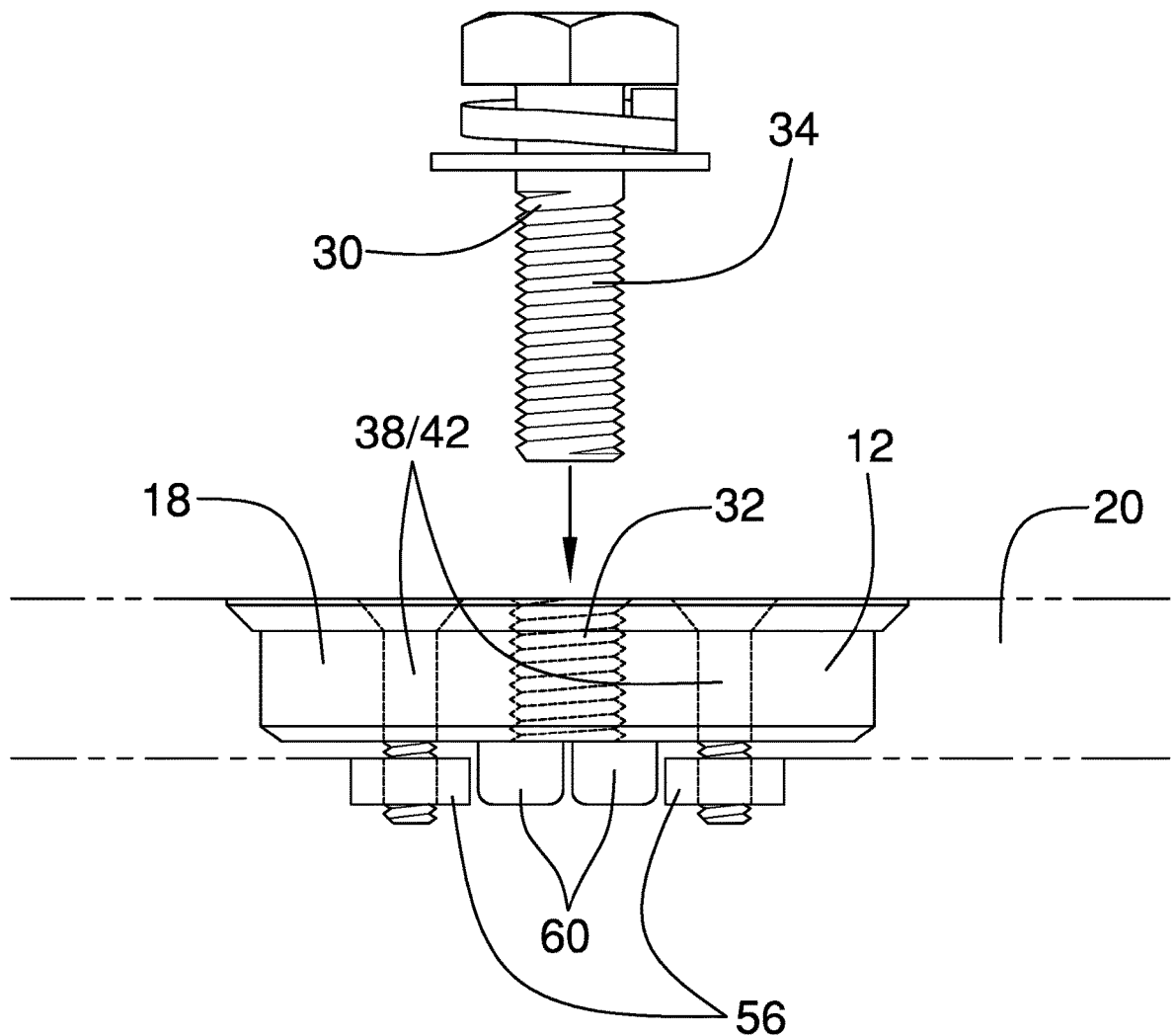
FIG. 8 is a side view of an embodiment of the disclosure.
Figure 9:
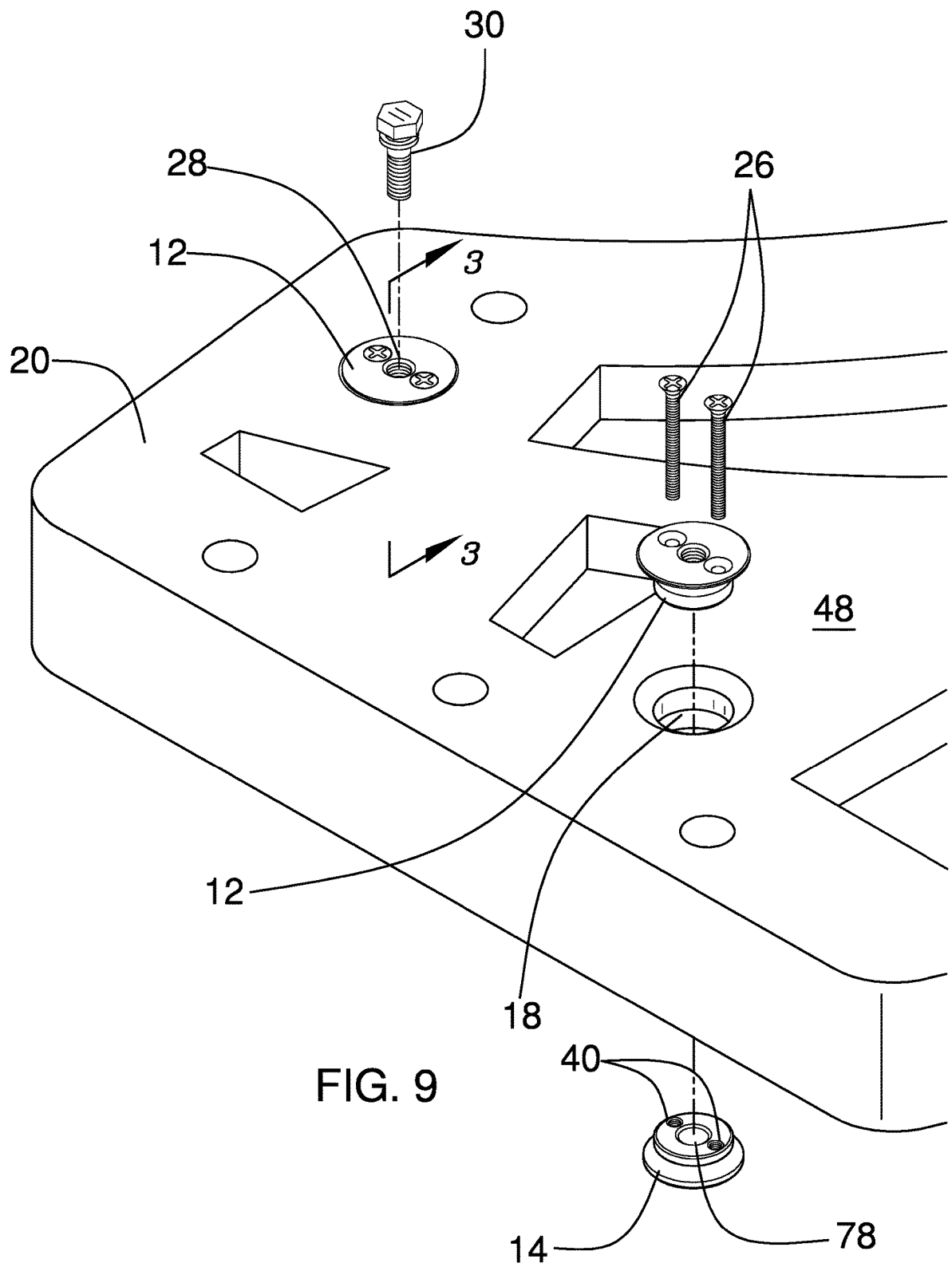
FIG. 9 is an in-use view of an embodiment of the disclosure.
Figure 10:
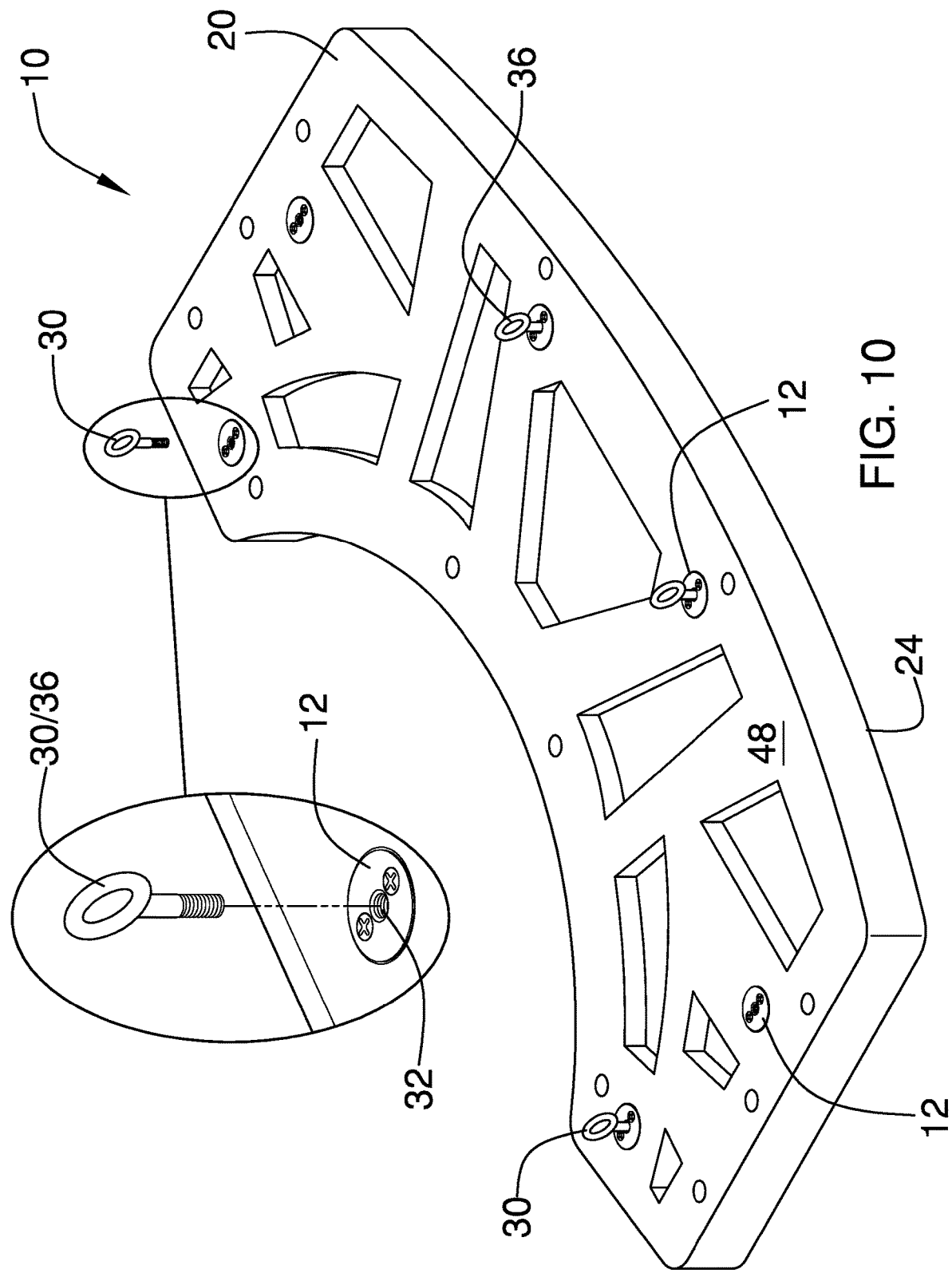
FIG. 10 is an in-use view of an embodiment of the disclosure.
Figure 11:
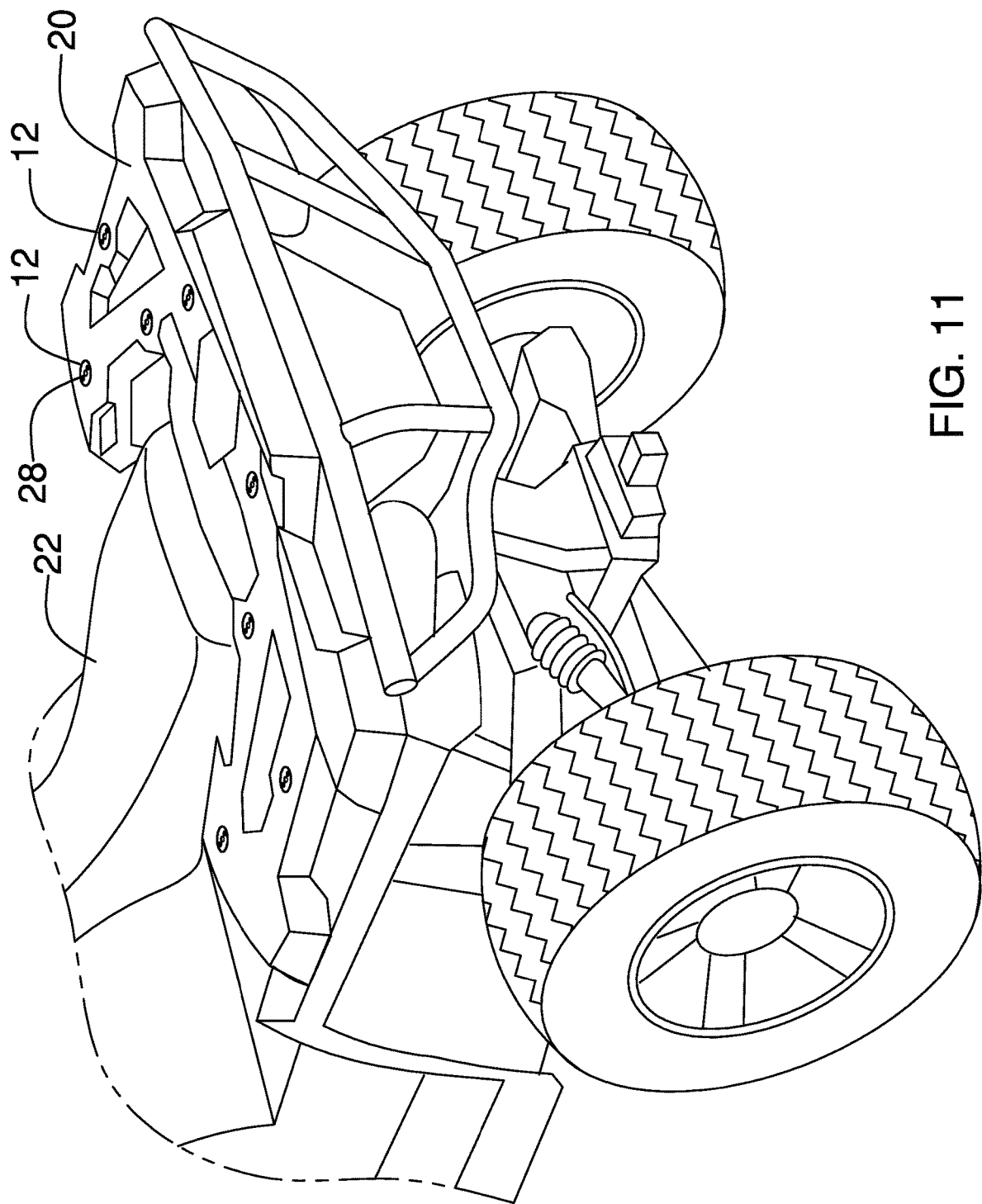
FIG. 11 is an in-use view of an embodiment of the disclosure.
Figure 12:
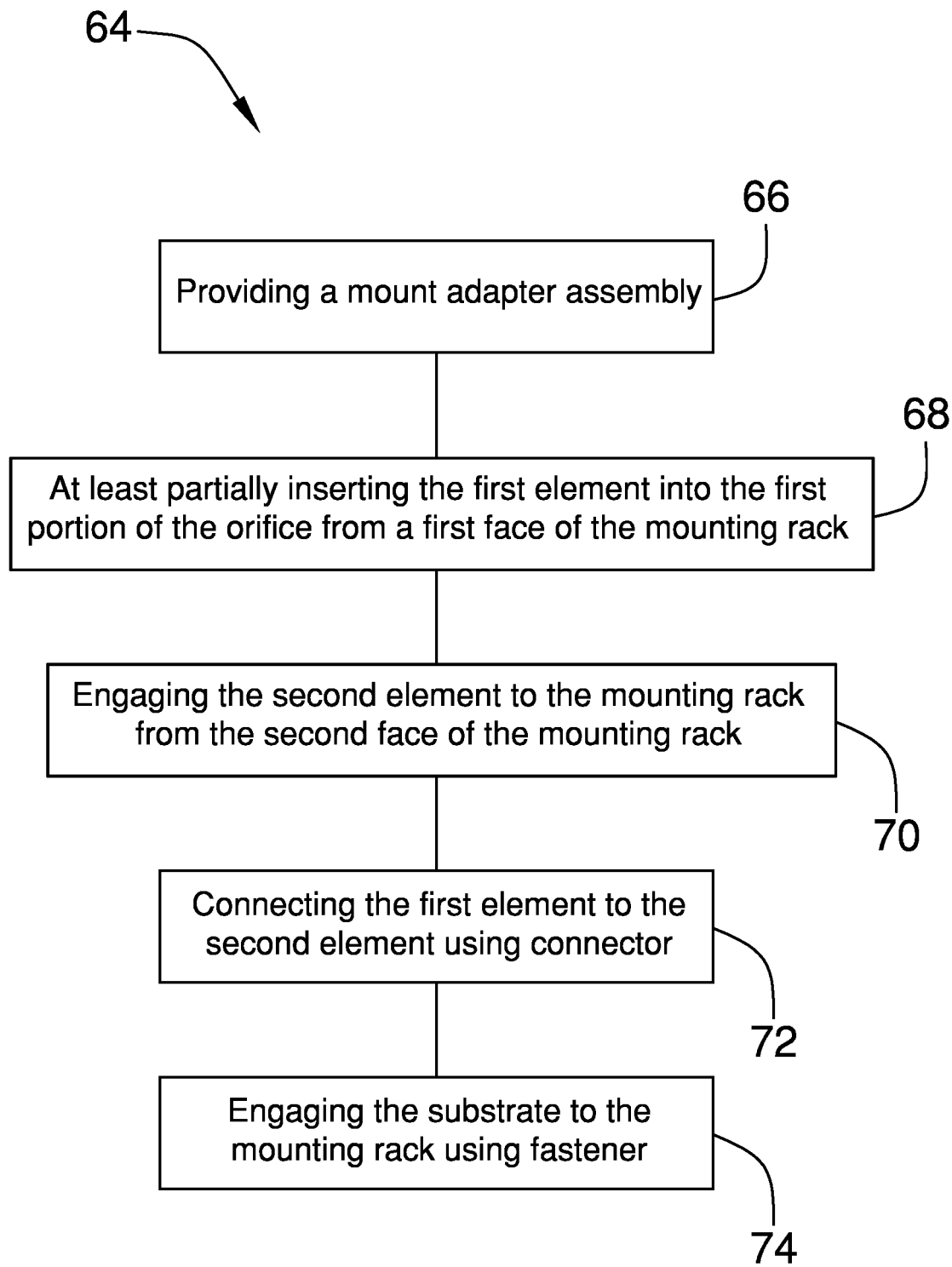
FIG. 12 is a flow diagram of a method utilizing an embodiment of the disclosure.

As shown in FIG. 8, the first element 12 may substantially occupy the orifice 18. The first element 12 shown in FIG. 8 is elongated along an axis 54 extending through the first holes 38, as shown in FIG. 3. The second element 14 in this case comprises a pair of nuts 56. Each nut 56 is elongated along one axis 58 extending perpendicularly from a hole 76 of the nut 56, as shown in FIG. 6, so that the nut 56 is configured to extend across the orifice 18.

A pair of tabs 60 is engaged to and extends from the inner face 62 of the first element 12. Each tab 60 is positioned proximate to a respective first hole 38. The tab 60 is positioned to engage a respective nut 56 to prevent rotation of the respective nut 56 as a respective screw 42 is threadedly inserted into the hole 76 of the nut 56. The tab 60 assures that the respective nut 56 is retained in a position where it extends across the orifice 18.

In use, the mount adapter assembly 10 enables a method 64 to engage a substrate 30 to a mounting rack 20. The method 64 comprises a first step 66 of providing a mount adapter assembly 10 according to the specification above. A second step 68 of the method 64 entails at least partially inserting the first element 12 into the first portion 16 of the orifice 18 from the first face 48 of the mounting rack 20. A third step 70 of the method 64 is engaging the second element 14 to the mounting rack 20 from the second face 24 of the mounting rack 20. A fourth step 72 of the method 64 requires connecting the first element 12 to the second element 14 using connector 26 so that the first element 12 and the second element 14 are coupled to the mounting rack 20. A fifth step 74 of the method 64 entails engaging the substrate 30 to the mounting rack 20 using the fastener 28. The substrate 30 then can be used to attach a variety of articles, independent of manufacturer, to the mounting rack 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mount adapter assembly comprising:
   a first element shaped substantially complementary to at least a first portion of an orifice positioned in a mounting rack of a vehicle, such that the first element is configured for at least partially inserting into the first portion of the orifice from a first face of the mounting rack;
   a second element configured for abutting the mounting rack from a second face of the mounting rack;
   a connector configured for engaging the first element to the second element, such that the first element and the second element are coupled to the mounting rack;
   a fastener engaged to the first element and being configured for engaging a substrate, such that the substrate is coupled to the mounting rack, wherein the fastener comprises a threaded hole extending axially through the first element; and
   wherein the second element is shaped substantially complementary to a second portion of the orifice, such that the second element is configured for inserting into a second portion of the orifice from the second face of the mounting rack; and
   a non-threaded hole axially positioned through the second element, such that the non-threaded hole is positioned for insertion of the bolt or the eyebolt.

2. The mount adapter assembly of claim 1, wherein the substrate comprises a bolt or an eyebolt.

3. The mount adapter assembly of claim 1, wherein the connector comprises:
   a pair of first holes positioned in the first element and bracketing the threaded hole, the first holes being threaded;
   a pair of second holes positioned in the second element, such that each second hole is selectively alignable with a respective first hole, the second holes being threaded; and
   a pair of screws, each screw being selectively threadedly insertable into a respective first hole and an associated second hole for removably engaging the first element to the second element, such that the first element and the second element are removably engaged to the mounting rack.

4. The mount adapter assembly of claim 3, wherein:
   a head of the screw is tapered; and
   the respective first hole is conical proximate to an outer face of the first element, such that the head of the screw is flush with the outer face after being threadedly inserted into the first hole.

5. The mount adapter assembly of claim 1, wherein the second element is tapered proximate to an exterior face thereof so that the exterior face is circumferentially larger than an interior face of the second element.

6. A mount adapter assembly comprising:
   a first element shaped substantially complementary to at least a first portion of an orifice positioned in a mounting rack of a vehicle, such that the first element is configured for at least partially inserting into the first portion of the orifice from a first face of the mounting rack;
   a second element configured for abutting the mounting rack from a second face of the mounting rack;
   a connector configured for engaging the first element to the second element, such that the first element and the second element are coupled to the mounting rack;
   a fastener engaged to the first element and being configured for engaging a substrate, such that the substrate is coupled to the mounting rack, wherein the fastener comprises a threaded hole extending axially through the first element;
   wherein the second element is shaped substantially complementary to a second portion of the orifice, such that the second element is configured for inserting into a second portion of the orifice from the second face of the mounting rack, wherein the second element is tapered proximate to an exterior face thereof so that the exterior face is circumferentially larger than an interior face of the second element; and
   wherein the exterior face of the second element is circular, such that the second element is frusto-conically shaped proximate to the exterior face and cylindrically shaped adjacent to the interior face.

7. The mount adapter assembly of claim 1, wherein the first element is tapered proximate to an outer face thereof, such that the outer face is circumferentially larger than an inner face of the first element, wherein, with the orifice being complementary tapered adjacent to the first face, the outer face of the first element is configured for being flush with the first face of the mounting rack when the first element is inserted into the orifice.

8. The mount adapter assembly of claim 7, wherein the outer face is circular, such that the first element is frusto-conically shaped proximate to the outer face and cylindrically shaped adjacent to the inner face.

9. A mount adapter system comprising:
   a mounting rack engaged to a vehicle;
   a first element shaped substantially complementary to at least a first portion of an orifice positioned in the mounting rack, the first element being at least partially inserted into the first portion of the orifice from a first face of the mounting rack;
   a second element abutting the mounting rack from a second face of the mounting rack;
   a connector engaging the first element to the second element, such that the first element and the second element are coupled to the mounting rack; and
   a fastener engaged to the first element and to a substrate, such that the substrate is coupled to the mounting rack.

\* \* \* \* \*